No. 788,638. PATENTED MAY 2, 1905.
F. C. FARMAR.
WINE OR SPIRIT CALCULATING SLIDE RULE.
APPLICATION FILED MAR. 11, 1902.
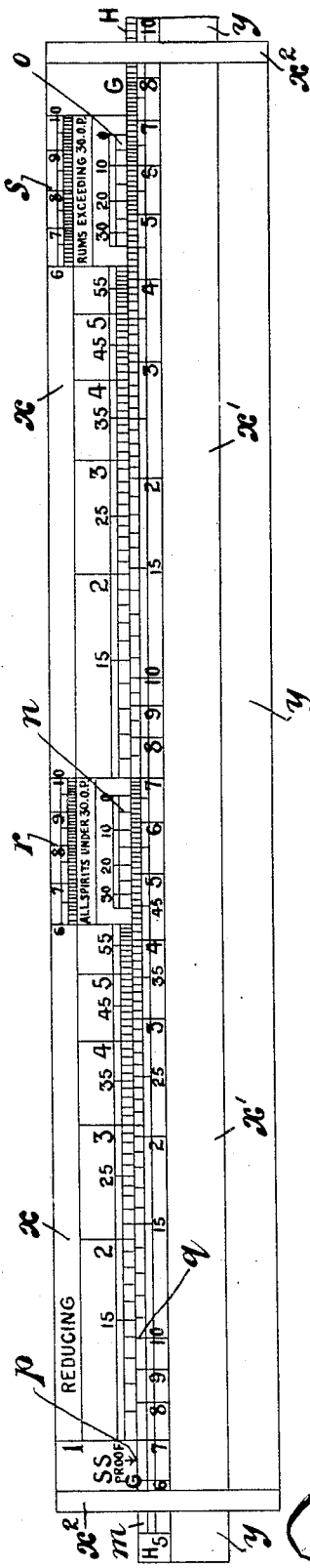
WITNESSES
INVENTOR
Francis Charles Farmar
BY
ATTORNEYS No. 788,638. Patented May 2, 1905.

UNITED STATES PATENT OFFICE.

FRANCIS C. FARMAR, OF WATERLOO, NEAR LIVERPOOL, ENGLAND.

WINE OR SPIRIT CALCULATING SLIDE-RULE.

SPECIFICATION forming part of Letters Patent No. 788,638, dated May 2, 1905.

Application filed March 11, 1902. Serial No. 97,776.

*To all whom it may concern:*

Be it known that I, FRANCIS CHARLES FARMAR, a subject of the King of England, and a resident of Waterloo, near Liverpool, in the county of Lancaster, England, have invented certain new and useful Improvements in Slide-Rules, of which the following is a specification.

My invention relates to slide-rules for use in calculating purposes in connection with wines and spirits.

The invention consists, essentially, of the application and use of certain new constructive characteristics, as hereinafter described.

A rule having the characteristics as herein specified is illustrated in the annexed drawing.

The rule is made of wood, ivory, or other suitable material and consists of two parallel pieces or bars $x$ $x'$, jointed together and kept apart by metal bars $x^2$, at either end, and a movable piece or slide $y$, slightly longer than the bars $x$ $x'$ and sliding freely between these pieces, a suitable continuous joint between the parts $x$, $x'$, and $y$, such as of the tongue-and-groove type, being provided to guide the part $y$ when being moved in the desired manner.

Referring to the drawing, it is to be stated that the numbers represented on the calculating scale-lines G H may be read either literally or the significant figures may be read as if they were supplemented by naughts (0) or by decimal points (.), according to the necessity of each case as it arises.

The scales G and H are special logarithmic scale-lines, which operate jointly and calculate the exact quantity of water required to reduce spirits and wherein contraction of bulk is allowed for automatically. The logarithmic scale-line G is constructed with two vertically-raised portions $r$ and $s$, and within the spaces provided by so raising these parts there are provided two subsidiary scales or lines $n$ and $o$. These subsidiary scales $n$ and $o$ serve as setting-points for the automatic calculations in a direct manner of the quantity of water required to reduce spirits, allowing for contraction in bulk, the $n$ scale or series being intended for all spirits under 30 overproof and the $o$ scale or series for rums exceeding 30 overproof. Instead of the two separate scales $n$ and $o$ a single scale on an adjustable slide may be used for both purposes to meet the difference in position in relation to the scale H. In front of the commencement of the scale G there is a third setting-point $p$ for use in connection with strong spirits only to be broken down to proof.

With regard to the scale portions $r$ $s$ and $n$ $o$, according to a modification, their relative arrangement may be the converse to that shown—namely, the two portions $r$ and $s$ may be disposed in the scale-line G, while the subsidiary lines or portions $n$ and $o$ are placed above them in the position of $r$ and $s$ of the drawing, the effect remaining the same. The logarithmic scale H on the slide $y$ has at its commencement a special or additional section-scale $m$, extending, preferably, from "5" to "10," prefixed at the point $q$, and this part is used in connection with the point $q$.

As instances of the calculations which may be effected by the employment of the rule, for reducing, in the case of ordinary conditions, the sum of the two strengths (*i. e.*, the present and the required strength) on H are set to the required strength on G, using the first or second and third position, according to the direction specified on the rule. Then under the quantity of spirit will appear the exact amount of water required to reduce it. In the case of from underproof to a further degree underproof the difference of the two strengths (*i. e.*, the present and the required strength) on G, using the second and middle position. Then under the quantity of spirit will appear the exact amount of water required to reduce it. In this condition it should be stated that a contraction in bulk takes place when spirits and water are mixed together. To meet this contraction, an increased quantity of water is required, the calculation of which must be based on the specific-gravity system. This the rule does automatically.

To properly understand the practical working of these subsidiary empirical lines $n$ and $q$, I should explain that they have been invented and built up by a systematic series of practical experiments on the varying rates of contraction that arise when spirit and water combine, the same not being derivable from any formula. It is a well-known fact that a gallon of spirit and a gallon of water will not make two gallons. This contraction or shrinkage in bulk is due to the interpenetration or marrying of the different-sized molecules which compose the two liquids. Directly water combines with spirit a chemical action is set up, heat being generated by the smaller molecules of the spirit breaking into and filling up the spaces between the larger molecules of the water. The contraction thus resulting is, however, compensated for by an increase of strength, so that by adding extra water we merely restore the equilibrium. To give an illustration, say one hundred wine-gallons of spirit at one hundred and twenty-four per cent. of proof or 24° overproof to be reduced to one hundred per cent. of proof or proof strength. Worked out by the pen, the water required appears to be twenty-four gallons. Thus $\frac{124-100}{100} = 24$; but this is incorrect. The result would not turn out one hundred and twenty-four gallons at proof, but 122.8 gallons at 1° overproof. The difference of bulk, due to contraction, is here an element of error. What is needed, therefore, is an additional 1.2 gallons of water to restore the bulk to one hundred and twenty-four gallons and to bring down the strength to proof—that is, we need 24.0+1.2 or 25.2 gallons of water altogether. This is the precise quantity of water shown at a glance through the intervention of the subsidiary line $n$, the method of the use being as follows: Set the sum of the two strengths on line H to the required strength in the middle position $n$. Then under the given quantity of spirit on line $g$ will immediately appear on line H the exact quantity of water required to effect the reducing, allowing for contraction in bulk. To take the previous example, one hundred wine-gallons of spirit at 24 overproof to be reduced to 0 or proof strength, 24+0=24. We therefore set "24" on line H to the required strength, "proof," in the middle position $n$. Then under one hundred gallons of spirit (represented on line G) we find 25.2 gallons, the true quantity of water required, (represented on line $h$.) Similarly to reduce, say, forty gallons of rum from 35 overproof to 20 underproof. The initial strength of the spirit being in excess of 30 overproof, we make use of the right-hand section $o$ in place of the middle section $n$. Then 35+20=55. We therefore set "55" on line H to 20 underproof at the right-hand position $o$. Then under forty gallons of spirit (represented on line G) we find 28.7 gallons, the true quantity of water required, (represented on line H.) It will be thus seen from the foregoing explanation and examples that the subsidiary empirical lines $n$ and $o$ automatically provide for the extra water needed to meet the contraction of spirit and water in all their combinations and is consequently of vital importance to persons interested in the liquor trade.

Having now particularly described my invention, what I claim as new, and desire to secure by Letters Patent, is—

1. In a wine and spirit calculating slide-rule, the logarithmic spirit-reducing scale G, having a raised portion, and a scale under said raised part, for automatically calculating in a direct manner the quantity of water required to reduce spirits, and a logarithmic scale H for use in connection with the scale G, substantially as set forth.

2. In a wine and spirit calculating slide-rule, the logarithmic spirit-reducing scale G, having raised portions $r$, $s$, and scales $n$ and $o$, under said raised parts $r$ and $s$, for automatically calculating in a direct manner the quantity of water required to reduce spirits, and having a setting-point $p$ for strong spirits, and a logarithmic scale H for use in connection with the scale G, and having at its commencement end a section-scale $n$ from 5 to 10 up to a point $q$ for operating in connection with the point $p$, substantially as set forth.

In witness whereof I have hereunto set my hand in presence of two witnesses.

FRANCIS C. FARMAR.

Witnesses:
TOM GOODALL,
LEONARD SRAWLEY.